(12) United States Patent
Mallaiyan Sathiaseelan et al.

(10) Patent No.: US 12,387,295 B2
(45) Date of Patent: Aug. 12, 2025

(54) DENOISING DEPTH IMAGE DATA USING NEURAL NETWORKS

(71) Applicant: Microsoft Technology Licensing, LLC, Redmond, WA (US)

(72) Inventors: Mukhil Azhagan Mallaiyan Sathiaseelan, Gainesville, FL (US); Sergio Ortiz Egea, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 455 days.

(21) Appl. No.: 17/452,860

(22) Filed: Oct. 29, 2021

(65) Prior Publication Data

US 2023/0134806 A1    May 4, 2023

(51) Int. Cl.
*G06T 5/70* (2024.01)
*G06N 3/045* (2023.01)
*G06N 3/08* (2023.01)
*G06T 7/13* (2017.01)

(52) U.S. Cl.
CPC ............... *G06T 5/70* (2024.01); *G06N 3/045* (2023.01); *G06N 3/08* (2013.01); *G06T 7/13* (2017.01); *G06T 2207/10028* (2013.01); *G06T 2207/20081* (2013.01)

(58) Field of Classification Search
CPC ... G06T 5/70; G06T 7/13; G06T 2207/10028; G06T 2207/20081; G06T 2207/20056; G06T 2207/20084; G06T 2207/20192; G06T 5/20; G06T 5/50; G06N 3/045; G06N 3/08
USPC ........................................................ 382/275
See application file for complete search history.

(56) References Cited

U.S. PATENT DOCUMENTS

| 2016/0239725 | A1* | 8/2016 | Liu | G06F 18/22 |
| 2018/0343432 | A1* | 11/2018 | Duan | G01S 17/894 |
| 2020/0007850 | A1* | 1/2020 | Van Nieuwenhove | H04N 13/128 |
| 2020/0240781 | A1* | 7/2020 | Ortiz Egea | G06T 5/70 |
| 2021/0089040 | A1* | 3/2021 | Ebrahimi Afrouzi | G05D 1/0248 |

(Continued)

OTHER PUBLICATIONS

D.P. Kingma, J. Ba, Adam: A Method for Stochastic Optimization, (2015) arXiv:1412.6980 (Year: 2015).*

(Continued)

*Primary Examiner* — Nay A Maung
*Assistant Examiner* — Heath E. Wells
(74) *Attorney, Agent, or Firm* — Alleman Hall & Tuttle LLP

(57) ABSTRACT

One example provides a computing device including a logic machine and a storage machine holding instructions executable by the logic machine to implement a depth image processing pipeline including a neural network, the neural network including an edge detecting layer. The neural network is configured to receive input of an active brightness image and receive input of one or more of real data or imaginary data of a complex depth image, the complex depth image corresponding to the active brightness image. The neural network is further configured to, at the edge detecting layer, apply one or more convolutional processes to the active brightness image to identify one or more edge pixels in the active brightness image, and at a second layer, denoise one or more of the real data or the imaginary data of the complex depth image based on the one or more edge pixels identified.

18 Claims, 13 Drawing Sheets

(56) References Cited

U.S. PATENT DOCUMENTS

| | | | | |
|---|---|---|---|---|
| 2021/0166124 | A1* | 6/2021 | Schäfer | G06N 3/08 |
| 2022/0036514 | A1* | 2/2022 | Niu | G06T 5/50 |
| 2022/0164973 | A1* | 5/2022 | Lee | G06T 7/55 |
| 2022/0188979 | A1* | 6/2022 | Kim | G06T 5/00 |
| 2022/0188987 | A1* | 6/2022 | Kim | G06T 5/70 |
| 2022/0252730 | A1* | 8/2022 | Van Nieuwenhove | G01S 17/36 |
| 2023/0081137 | A1* | 3/2023 | Ortiz Egea | G01S 17/894 |
| | | | | 382/173 |
| 2023/0266473 | A1* | 8/2023 | Loot | G01S 17/931 |
| | | | | 356/21 |

OTHER PUBLICATIONS

D.P. Kingma, J. Ba, Adam: A Method for Stochastic Opitmization, (2015) arXiv:1412.6980 (Year: 2015).*

"Phase Unwrapping for Time-of-Flight Sensor Based on Image Segmentation" published by IEEE Sensors Journal vol. 21, No. 19, pp. 21600-21612, Oct. 1, 2021 by Jun Wang, Peilin Liu, Fei Wen, Rendong Ying, and Weihang Wang (Year: 2021).*

Agresti, et al., "Unsupervised Domain Adaptation for ToF Data Denoising with Adversarial Learning", In Proceedings of IEEE/CVF Conference on Computer Vision and Pattern Recognition, Jun. 15, 2019, pp. 5579-5586.

"International Search Report and Written Opinion Issued in PCT Application No. PCT/US22/039652", Mailed Date: Dec. 9, 2022, 11 Pages.

Wang, et al., "Phase Unwrapping for Time-of-Flight Sensor Based on Image Segmentation", In Journal of IEEE Sensors, vol. 21, Issue 19, Oct. 1, 2021, pp. 21600-21611.

* cited by examiner

DENOISING DEPTH IMAGE DATA USING NEURAL NETWORKS

BACKGROUND

Depth sensing systems, such as time-of-flight (ToF) cameras, may be used to produce a depth image of an environment, with each pixel of the depth image representing a distance to a corresponding point in the environment. At each pixel of an image sensor of a ToF camera, the distance to a surface is determined based on a round-trip time interval for light emitted by the ToF camera to reflect from the surface and return to the pixel.

SUMMARY

Examples are disclosed that relate to using neural networks for denoising depth image data. One example provides a computing device comprising a logic machine and a storage machine holding instructions executable by the logic machine to implement a depth image processing pipeline comprising a neural network, the neural network comprising an edge detecting layer. The neural network is configured to receive input of an active brightness image and receive input of one or more of real data or imaginary data of a complex depth image, the complex depth image corresponding to the active brightness image. The neural network is further configured to, at the edge detecting layer, apply one or more convolutional processes to the active brightness image to identify one or more edge pixels in the active brightness image, and at a second layer, denoise one or more of the real data or the imaginary data of the complex depth image based on the one or more edge pixels identified.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
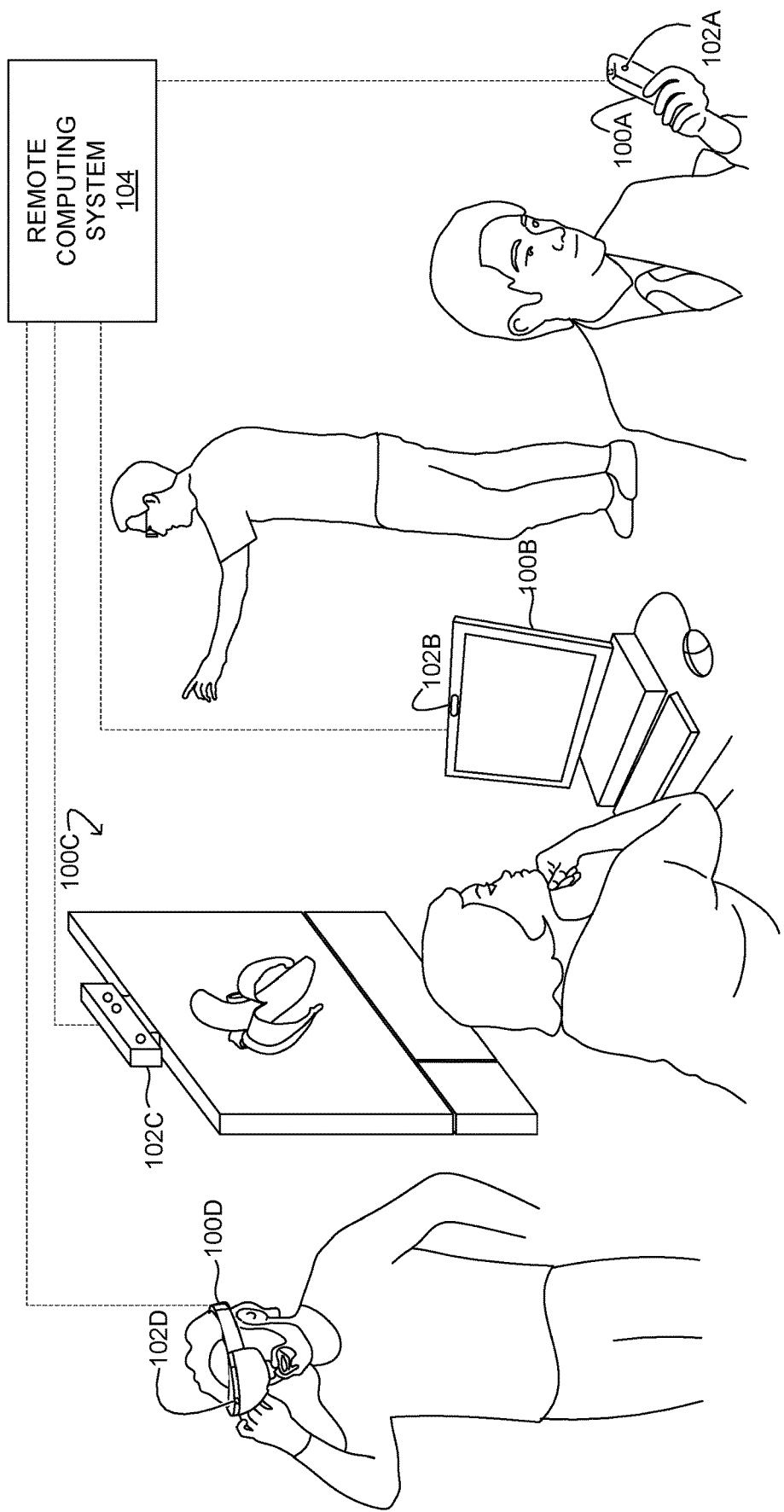
FIGS. 1A-1B show example electronic devices comprising time-of-flight (ToF) cameras.

Time-of-flight (ToF) depth cameras measure, for each sensor pixel of a depth image sensor, a length of a time interval for light emitted by the depth camera to return back to the sensor pixel. As reflectivity may vary across objects in a scene, some pixels may sense signals with low signal to noise ratios in some instances. As such, surfaces at different distances may have different noise levels. Further, depth image sensor pixels may be sensitive to various types of noise (e.g., shot noise, thermal noise, or read noise) and signal contamination, such as crosstalk errors, which occur when photoelectrons captured at one pixel diffuse toward and are collected at neighboring pixels. Low reflectivity, signal contamination, and/or other sources of noise may lead to poor depth estimates and unsatisfactory depth images.

In view of such issues, denoising is commonly performed on raw depth image data prior to performing other data processing, such as phase unwrapping that is used in phase-based ToF imaging. Phase-based ToF imaging is a variant of ToF imaging in which depth is computed based on the phase shift of amplitude modulated light reflected back from a subject. In phase-based ToF imaging, a light source on the ToF camera illuminates a scene with amplitude modulated light. The time delay is measured by cross correlating the reflected signal against the reference signal for the light source. The amplitude and phase shift of the reflected signal can be recovered using a plurality of measurements and a Discrete Fourier Transform (DFT). The phase shift in the light reflected back from the subject is proportional to the subject's distance modulo the wavelength of the modulation frequency.

However, due to the periodic nature of the modulated light, the measured phase repeats (or wraps) every 2π. Since the number of phase wrappings cannot be directly measured via a phase based ToF pixel, the total phase, and thus the actual distance related to the measurement, is ambiguous. To address this issue, two or more different modulation frequencies can be used to increase the range of unambiguity. This allows the phase information to be "unwrapped" for the accurate determination of distance, as the distance ambiguities are different for each frequency of illumination light.

Noise and signal contamination can lead to incorrect unwrapping, and thus relatively large errors in a determined distance at a pixel. As such, depth engine pipelines (processing pipelines used to process depth image data) commonly include procedures to denoise the data prior to performing phase unwrapping. For example, a depth sensor may perform multi-frequency phase collection to obtain noisy data for a plurality of modulation frequencies. Then, the noisy data is processed via signal calibration correction and denoising. After denoising, the total phase can be calculated from the complex signal, followed by phase unwrapping and crosstalk correction. After optional post-processing, the final depth and, in some examples, intensity images are output, e.g., for use in gesture identification, AR applications, and/or other uses.

Various denoising and post-processing operations may be utilized, such as multipath corrections, crosstalk corrections, smoothing operations, and/or jitter reduction. Traditional denoising methods applied to ToF sensor data include a joint bilateral filter, an adaptive weighted Gaussian, median filtering, wavelets, anisotropic diffusion, and other variations thereof. Some methods may include a variable denoising kernel, which can offer performance improvements. However, as the local kernel is calculated multiple times, methods that utilize variable kernels may consume significant time and computing resources compared to the use of a bilateral filter and variants thereof.

Recently, neural networks (NN) and other convolutional based approaches have been proposed for denoising depth data. Denoising via a neural network may offer some advantages over other denoising methods. For example, a neural network may exploit vectorized processing libraries and make use of specialized processors (e.g., Graphics Processing Unit (GPU) or Tensor Processing Unit (TPU)) for fast computations. Further, a convolutional neural network (CNN) can make use of local neighborhood information of different kernel sizes to improve performance. However, as complex signal data may range in both positive and negative values, training a neural network to process these varying signs may be challenging. Further, the neural network may fail to preserve edge information or adapt to dynamic noise distribution. As such, performance of standard neural networks may be unsatisfactory for processing ToF depth image data.

Accordingly, examples are disclosed related to training and utilizing neural networks for processing ToF sensor data. The disclosed examples utilize an architecture that uses both active brightness and complex data to create a guiding operation in a first convolutional layer. Each kernel of the convolutional layer can be trained to learn a differently weighted function based on the local noise in the active brightness data.

Further, example are disclosed that relate to neural networks comprising an edge detecting layer configured to identify edges by performing convolutional operations on active brightness data. In such examples, an active brightness image and a corresponding real or imaginary complex depth image are provided to a neural network. At the edge detecting layer, edge pixels are identified via convolutional operations and thresholding (e.g., based upon a determined standard deviation). One or more convolutional layers denoises pixels of the complex depth image that do not correspond to edge pixels in the active brightness image. The denoised complex data is then output for further processing in a depth engine pipeline (e.g., phase unwrapping). Further, edge pixels can be denoised in a later crosstalk-correcting stage.

Denoising ToF sensor data using a neural network may allow a depth engine pipeline to utilize specialized components (e.g., GPU/TPU) for faster computation. Further, use of an edge detecting layer may help avoid smoothing over edge regions and help mitigate unwrapping errors. Additionally, smaller kernel sizes can be used when relatively close to an edge while larger kernel sizes can be used to denoise pixels further from edges. As such, using a neural network with an edge detecting layer can improve noise reduction by smoothing over larger regions located farther away from edge pixels.

Examples are also disclosed for training neural networks to learn the noise distribution in ToF images. In some such examples, an active brightness image is combined (e.g., concatenated) with a real or imaginary complex depth image. The combination can be convolved in a first layer and the results combined in a second layer using a weighted sum, resulting in a denoised image. During training the denoised image results are compared with a ground truth image via a loss function (e.g., L2 (Least square errors) loss function). In some examples, training is performed using Adam, an adaptive first order gradient optimization function, which can iteratively update weights based on errors [see D. P. Kingma, J. Ba, *Adam: A Method for Stochastic Optimization*, (2015) arXiv:1412.6980]. After training, the trained neural network can be used to denoise a real or imaginary complex depth image. Further, an edge detecting layer can be configured to identify edge pixels and then used with a trained denoising neural network to help with denoising and/or other image processing tasks.

Figure 1B:
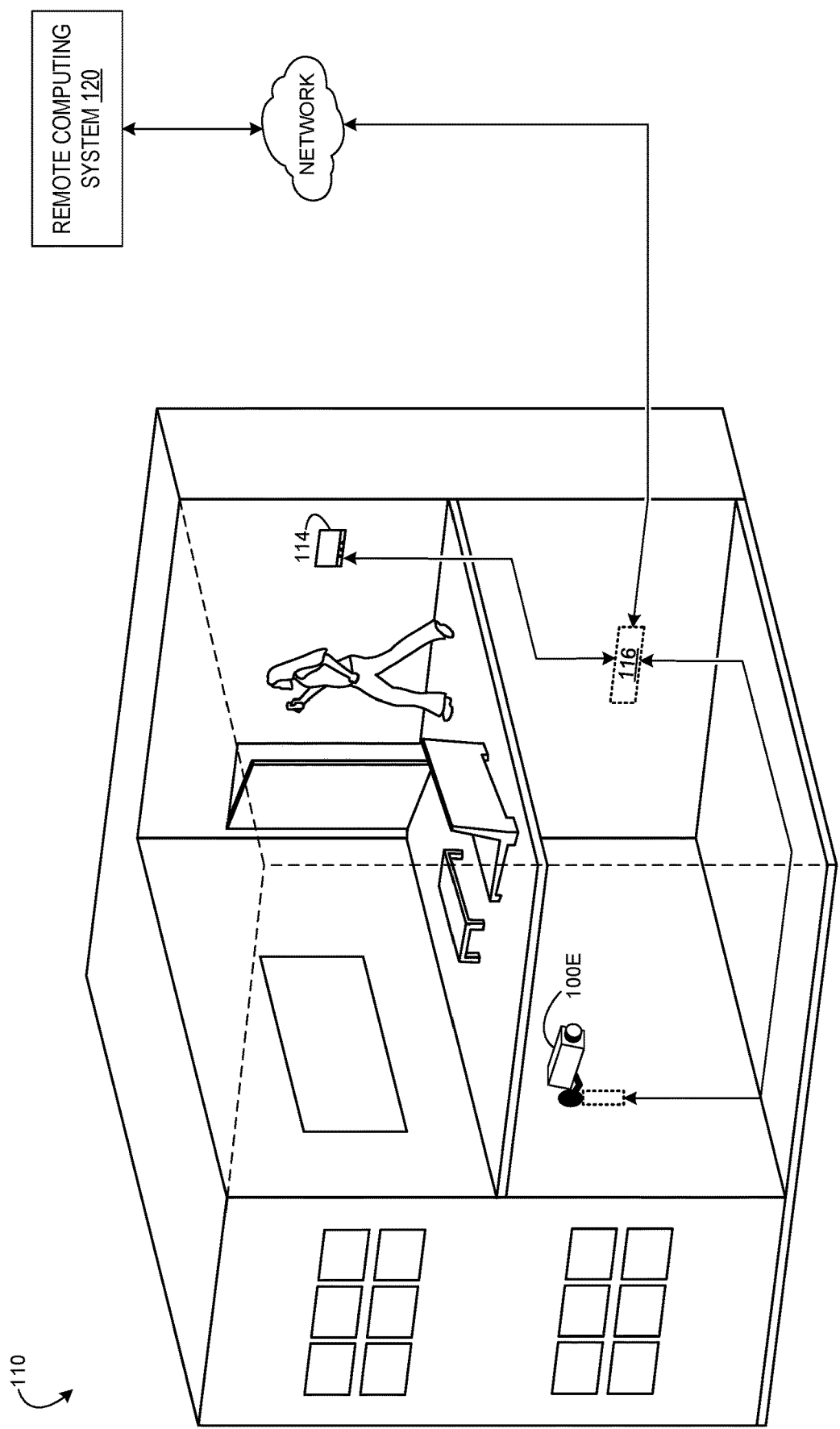

Prior to discussing these examples in detail, FIGS. 1A-1B illustrate various different example electronic devices 100A-E that may employ phase-based ToF depth ToF cameras. Referring first to FIG. 1A, device 100A is a smartphone that includes a ToF camera 102A. Device 100B is a personal computer that includes a ToF web camera 102B. Device 100C is a video game system that includes a peripheral camera system comprising a ToF camera 102C. Device 100D is a virtual-reality headset that includes a camera system comprising a ToF camera 102D. Each device may implement an embedded (also referred to as "monolithic") depth engine pipeline including a neural network. In other examples, each device may communicate with a remote computing system 104 to implement a distributed depth pipeline that includes a neural network according to the disclosed examples. Remote computing system 104 may comprise any suitable computing system, such as a cloud computing system, a PC, a laptop, a phone, a tablet, etc.

FIG. 1B shows an example use environment 110 including a security camera 100E comprising a ToF camera. Security camera 100E sends data to a remote computing system 120 via a communication hub 116. Remote computing system 120 may comprise any suitable computing system, e.g., an internet-of-things (IoT) endpoint device, a cloud computing system, an enterprise system, a networked PC, or a virtual machine implemented on a cloud computing system. Communication hub 116 also connects to other IoT devices, such as a thermostat 114. In combination with communication hub 116 and/or remote computing system 120, security camera 100E may process depth image data within a distributed depth engine pipeline that includes a neural network. In other examples, security camera 100E and/or communication hub 116 may process depth data via an embedded depth engine pipeline that includes a neural network.

Figure 2:
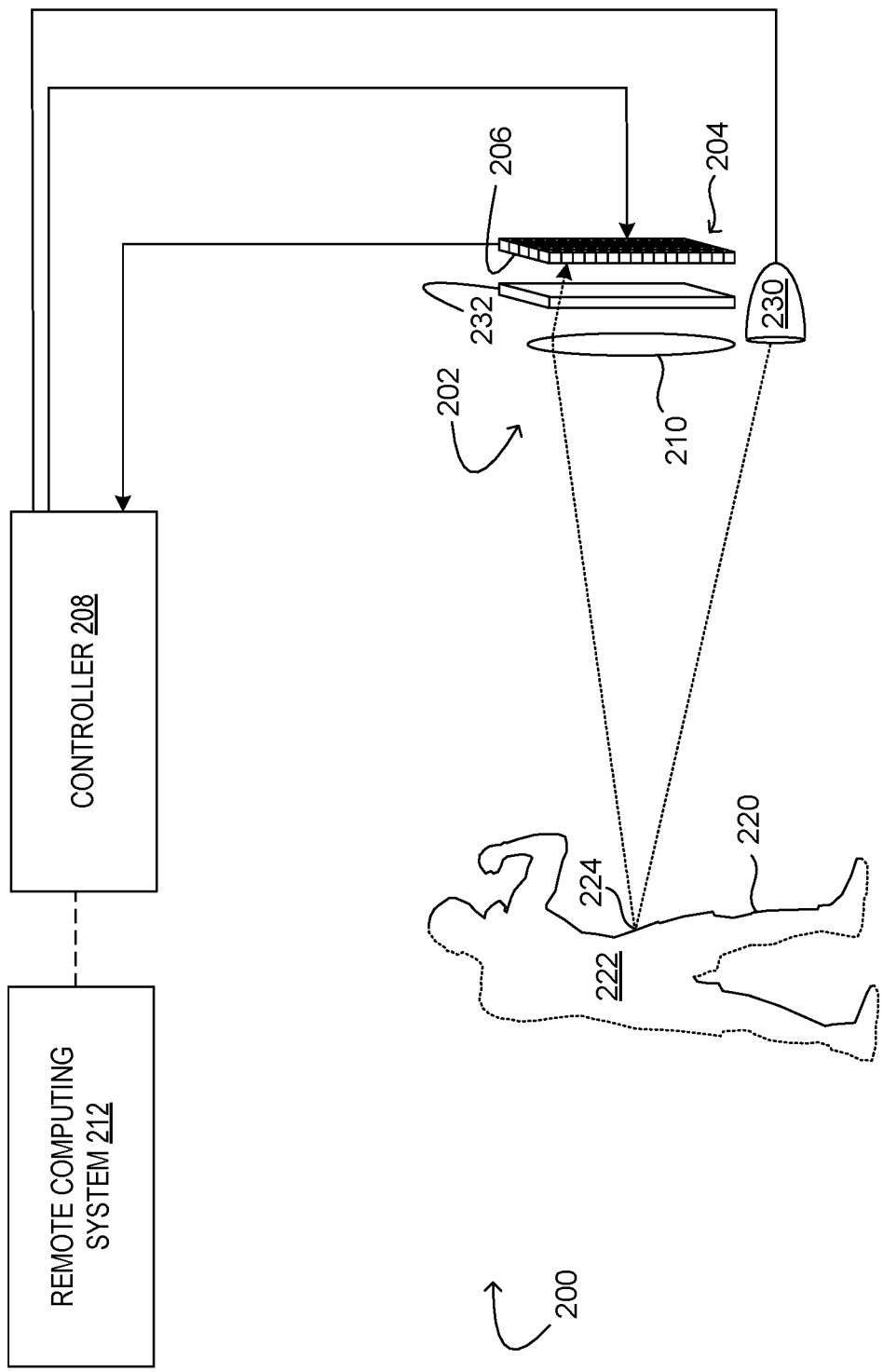
FIG. 2 shows aspects of an example ToF camera system.

FIG. 2 shows a schematic depiction of an example phase-based ToF depth imaging system 200 including a ToF camera 202. ToF camera 202 includes a sensor array 204 comprising a plurality of ToF pixels 206 each configured to acquire light samples that capture phase data, a controller 208, and an objective lens system 210. Objective lens system 210 is configured to focus an image of at least one surface 220 of a subject 222 onto sensor array 204. Controller 208 is configured to gather and process data from ToF pixels 206 of sensor array 204 and thereby construct a depth image. Controller 208 may comprise executable instructions (e.g., software, firmware and/or hardware) to perform depth image processing, such as denoising using a neural network and phase unwrapping, as described below. Controller 208 may be implemented across one or more computing devices.

In some examples, controller 208 may communicate with a remote computing system 212 to perform depth image processing in accordance with the distributed depth image processing pipeline examples disclosed herein. Examples of hardware implementations of computing devices configured to perform phase unwrapping are described in more detail below with reference to FIG. 13.

Depth imaging system 200 also includes a modulated light emitter 230, and an analog and/or digitally modulated electronic shutter 232 for sensor array 204 to control the integration of light by the sensor array 204. Modulated light emitter 230 and sensor array 204 may be controlled via controller 208. Modulated light emitter 230 may be configured to emit electromagnetic radiation having any frequency detectable by ToF pixels 206. For example, modulated light emitter 230 may include an infrared (IR) light-emitting diode (LED), laser diode (LD), or any other suitable light source. The amplitude modulated light may be modulated at different frequencies sequentially or simultaneously, e.g., the modulation waveform may comprise a manifold of frequencies.

Sensor array 204 is configured to sample light from modulated light emitter 230 as reflected off surface 220 and back to the camera. Each ToF sensing pixel 206 of sensor array 204 may comprise two or more pixel taps operable to integrate the reflected light signal at different times, from which the phase shift can be determined. Sensor array 204 is controlled, for each modulation frequency, to sample light at plural phase angles of the amplitude-modulated light from the light source, and determine a phase sample for each modulation frequency from the plurality of light samples for the modulation frequency. The phase samples can then be unwrapped to obtain a depth value for each pixel.

As mentioned above, due to the periodic nature of the modulated light, the measured total phase repeats (or wraps) every $2\pi$. For example, given a measured phase $\tilde{\phi}(f)$ for an amplitude modulation frequency f, the total phase is $\tilde{\phi}(f)+2\pi n(f)$, where n(f) is an integer. Since n(f) cannot be directly measured via a phase based ToF pixel, the total phase, and thus the actual distance related to the measurement, is ambiguous. Thus, in phase-based ToF imaging, there is a limitation on the distance that can be measured (referred to as the unambiguity range) imposed by the modulation frequency. As mentioned above, two or more different modulation frequencies can be used to increase the unambiguity range, and the collected phase shift data is then unwrapped for the accurate determination of distance.

Figure 3:
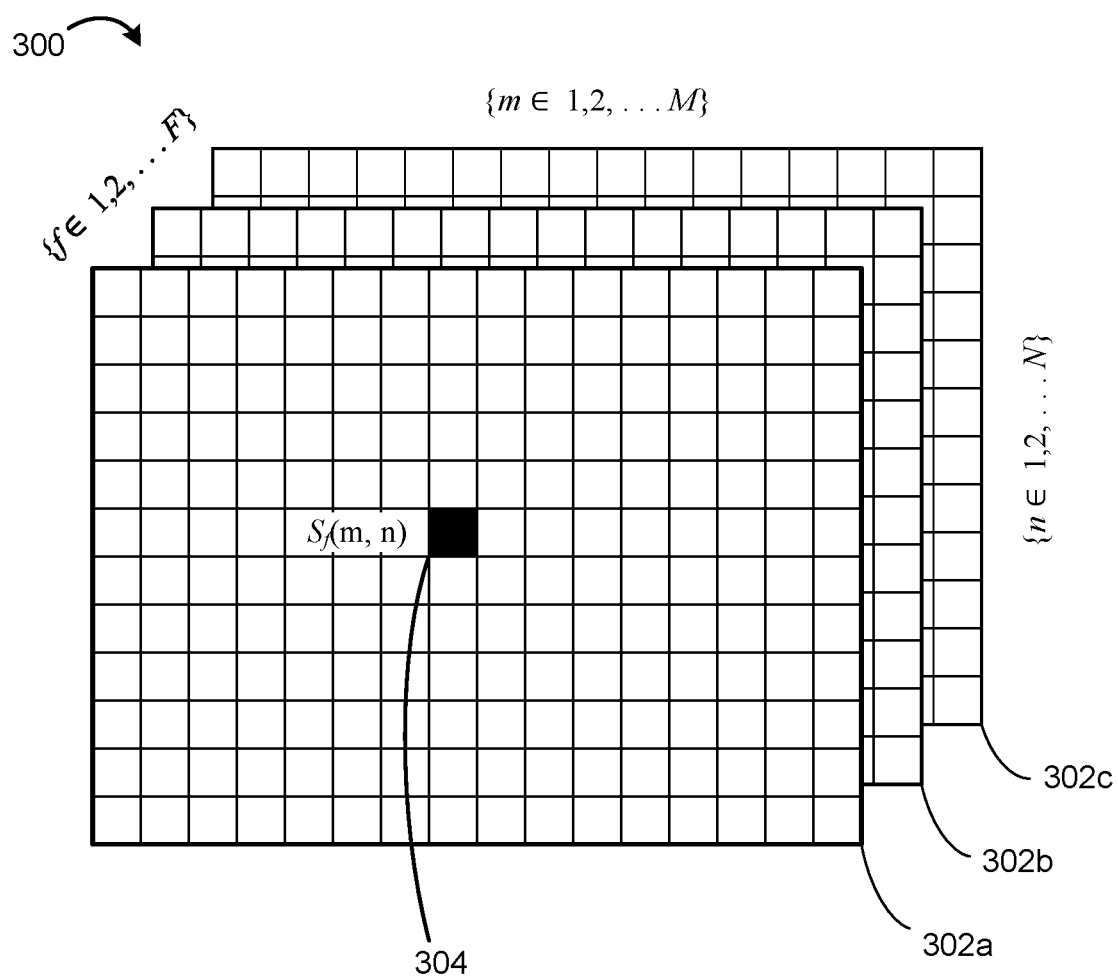
FIG. 3 schematically illustrates example ToF image data for a plurality of modulation frequencies.

FIG. 3 schematically illustrates example ToF image data 300 for a plurality F of modulation frequencies. Data 300 represents data that can be acquired by depth imaging system 200 during multi-frequency frame collection. In the example shown, the depth data comprises a M×N array of data for each of F modulation frequencies, resulting in M×N grids 302a-c of data, wherein each pixel 304 in each grid represents a measurement acquired at a corresponding illumination light modulation frequency f of F modulation frequencies. For example, the experimental signal $\tilde{S}$ collected by pixel 304 at (m,n), for the modulation frequency k is represented by $$\tilde{S}(m,n,f) = \tilde{A}B(m,n,f)e^{i\tilde{\phi}(m,n,f)}$$

where $\tilde{\phi}(f)$ is the phase, $\{m \in 1, 2 \ldots, M\}$, $\{n \in 1, 2 \ldots, N\}$, and $\{f \in 1, 2 \ldots, F\}$. A tilde accent over a variable indicates that the variable is obtained and/or calculated experimentally, while the absence of a tilde accent indicates variables that correspond to a noise-free situation. While the example depicted in FIG. 3 shows three grids 302a-c, any number of frequencies F≥2 can be used.

The modulating signals for the active illumination and sensor are both sinusoidal signals. As discussed above, amplitude and phase shift of this sinusoidal function can be done using two taps and a Discrete Fourier Transform (DFT). However, in practice, three or more taps can be used. The sampling gives a noisy measurement where the amplitude encodes the reflectivity of the object and distance, and the phase encodes the distance of the object. The DFT process may proceed using $$\begin{cases} S_r(f) = \sum_{n=0}^{N} I(n,f) \cdot \cos\left(\phi + \frac{2\pi}{N} \cdot n\right) \\ S_i(f) = \sum_{n=0}^{N} I(n,f) \cdot \sin\left(\phi + \frac{2\pi}{N} \cdot n\right) \end{cases}$$

where I(n,f) is the intensity captured by the pixel at tap n of N total taps, $\phi$ is the phase shift, $S_i(f)$ is the imaginary part of the signal collected for frequency f and $S_r(f)$ is the real part of the signal collected.

The phasors may be written in terms of the complex signal as $$\begin{cases} \phi(f) = a\tan\left(\frac{S_i(f)}{S_r(f)}\right) \\ AB(f) = \|S_r(f) + iS_i(f)\| \end{cases}$$

where $\phi(f)$ is the phase of the complex signal and AB(f) is the active brightness. The measured phase is used to compute the depth value associated with the pixel. As mentioned above, a set of F≥2 modulation frequencies f can be used to increase the range of unambiguity, allowing the phase information to be unwrapped for the accurate determination of distance. For example, in a multifrequency method, the amplitude modulated light may comprise a waveform comprising a plurality of frequencies $\vec{f} = \{f_1, f_2, \ldots, f_F\}$. The collection of frequencies comprises frequencies that are chosen to wrap at different locations in the unambiguity range, which extends from distance zero to a point where all three frequencies wrap at a common distance.

Based on the uncertainty propagation of the phasors above, the error may be linear for complex terms $\tilde{S}_r$ and $\tilde{S}_i$. The uncertainty propagation for AB may also be linear while the uncertainty in the phase may be inversely dependent on AB as $$\begin{cases} \Delta\tilde{\phi}(f) \alpha \frac{\Delta I(f)}{AB} \\ \Delta\tilde{AB}(f) \alpha \Delta I(f) \end{cases}$$

where $\Delta$ indicates uncertainty of the noisy value. The error leads to lower precision and, in some cases, unwrapping errors. Such unwrapping errors may be referred to as "flying pixels".

Figure 4A:
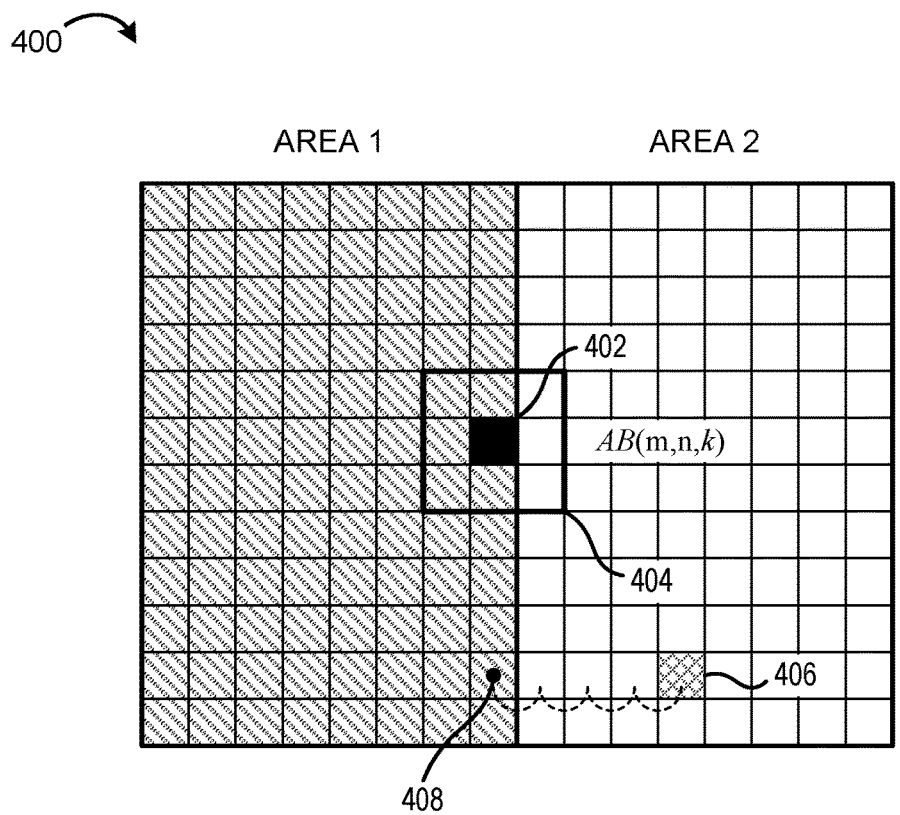
FIGS. 4A-4B schematically show an example of signal contamination via diffusion for a pixel at an edge region.

Multifrequency frame collection also may be affected by noise arising from electrical and/or optical diffusion of photoelectrons near edge regions of a depth image. Such noise may be referred to as crosstalk. FIG. 4A shows example ToF image data 400 where signal diffusion at an edge causes signal contamination in a ToF pixel 402. ToF image data 400 represents data for a single amplitude modulation frequency f. ToF pixel 402 is located near the border between two regions: Area 1 (hatched lines) and Area 2.

Figure 4B:
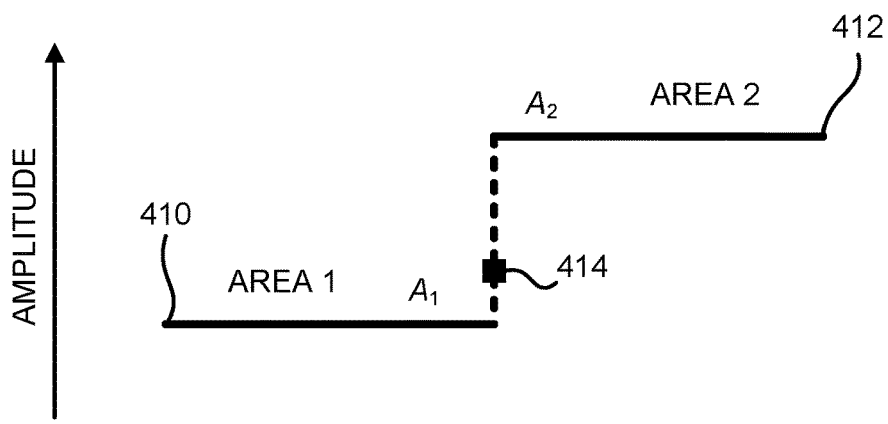

Area 1 and Area 2 have different amounts of signal (i.e., different active brightness amplitude) as shown in FIG. 4B. Crosstalk may occur in an edge region between two such areas with different amounts of signal. The effect may produce a warping in the active brightness and phase which is translated as a warping in the evaluated depth. This may reduce signal to noise ratio and reduce the probability of unwrapping correctly. As shown in FIG. 4B, Area 1 has a first, lesser active brightness level 410 while Area 2 has a second, greater active brightness level 412. As a result, the active brightness for pixel 402 may be at 414, intermediate between the levels of Area 1 and Area 2.

Figure 5:
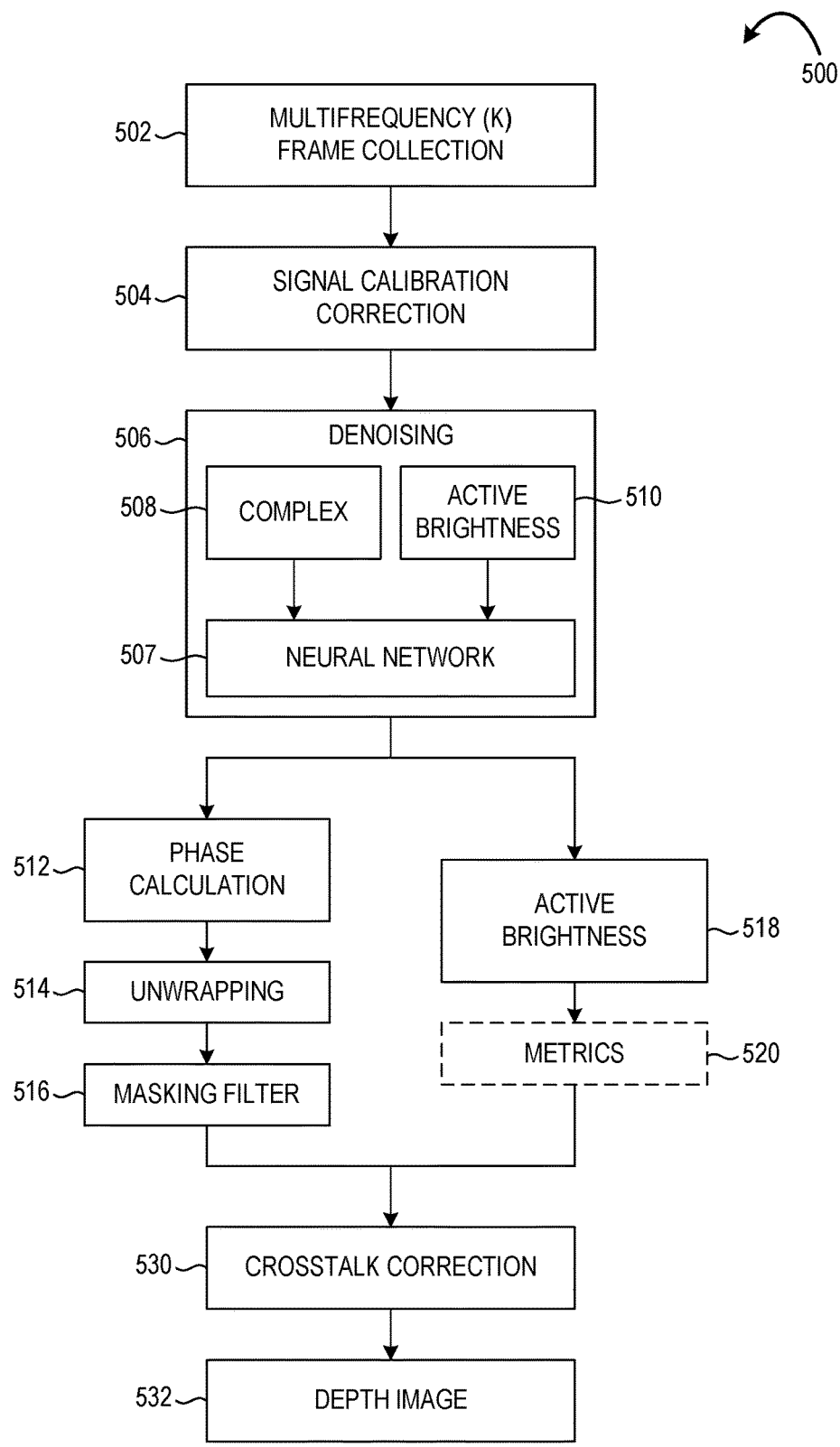
FIG. 5 shows a schematic depiction of an example depth image processing pipeline comprising a neural network for processing depth data.

In view of these potential sources of noise, FIG. 5 shows a flow diagram depicting an example depth processing pipeline as a method 500 for processing depth data. In some examples, method 500 may be implemented on a computing system that receives data from a remotely located depth camera. In other examples, method 500 may be implemented on a computing device incorporating the depth camera as an "embedded" depth engine pipeline. At 502, method 500 comprises performing multifrequency frame collection, where a plurality of phase samples (each comprising a frame of image data) are collected via a ToF image sensor for each of a plurality of amplitude modulation frequencies. At 504, signal calibration correction is performed to obtain complex depth image data and active brightness data. The complex depth image data comprises real depth image data and imaginary depth image data for each pixel of data.

Method 500 further comprises, at 506, denoising the complex depth image data via neural network 507. A real and/or imaginary complex depth image 508 (i.e., a real part of a complex depth image and/or an imaginary part of a complex depth image) and an active brightness image 510 are input into neural network 507, which utilizes one or more convolutional layers to perform denoising. In some examples, neural network 507 may comprise an edge detecting layer configured to identify probable edge pixels, which may be denoised in a later crosstalk correction process. More detailed examples of neural network 507, the edge detecting layer of the neural network, and parallel processing architectures are discussed below by way of example with regards to FIGS. 6-10.

Method 500 further comprises performing phase calculations at 512 and phase unwrapping at 514 to obtain depth image data. At 516, the method may optionally comprise applying one or more masking filters to the complex depth image data. Masking filters are threshold parameters that can be applied, for example, to remove poorly conditioned points, such as low Active Brightness pixels that produce pixels, low confidence pixels, and/or pixels that are not actively illuminated by the illumination source of the depth camera.

Active brightness data 518 can be further processed to identify pixels for post processing operations. In some examples, at 520, method 500 comprises computing metrics based on active brightness data 518. Such metrics may be helpful in identifying crosstalk errors, multipath interference, low signal pixels, or other potential noise issues. Method 500 further comprises, at 530, performing crosstalk correction, which may be based on one or more of the location of edge pixels identified by neural network 507 and/or the metric computed at 520. In some examples, image segmentation may be performed using one or more threshold values, followed by crosstalk correction on a segmented region.

Method 500 further comprises outputting a depth image at 532. In some examples, the depth image is output together with the active brightness image. In some examples, the final images may be output to software applications on a remote computing system, to a device incorporating the ToF camera, or to a cloud computing system. In other examples, the final images may be output to any other suitable device or program.

Figure 6:
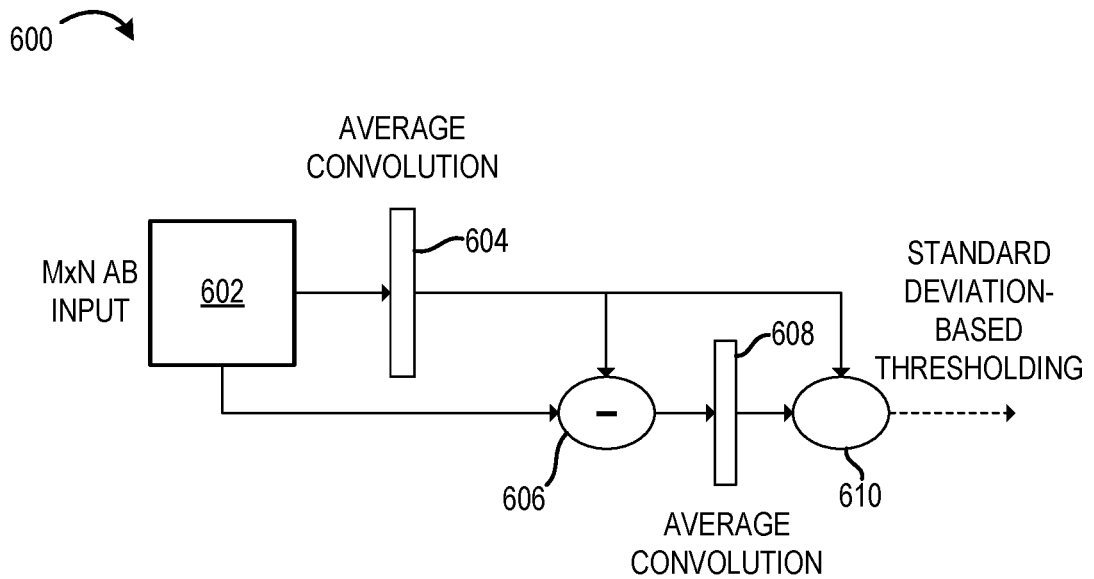
FIG. 6 shows a schematic depiction of an example edge detecting layer of a neural network for determining edge pixels in an active brightness image.

As described above, a denoising neural network according to the present disclosure may comprise an edge detecting layer comprising one or more convolutional layers configured to identify edges. FIG. 6 schematically shows an example edge detecting layer 600 for detecting edge pixels in a ToF depth image. Edge detecting layer 600 receives as input an M×N active brightness (AB) image 602 corresponding to the ToF depth image. The image may comprise any suitable size (e.g., resolution and number of pixels). Active brightness image 602 is input to a first average convolutional layer 604, which uses a k×k neighborhood to compute a local mean at each pixel. Any suitable neighborhood size can be used (3×3, 5×5, and/or 7×7, as examples).

Output from first convolutional layer 604 is input, together with active brightness image 602, to a difference layer 606. Difference layer 606 performs a difference operation to determine a standard deviation. In some examples, determining the standard deviation comprises determining an approximation of the standard deviation. For example, the standard deviation can be determined using $$I_{edge}(i,j) = I(i,j) - \frac{1}{N}\sum_{u=-a}^{a}\sum_{v=-b}^{b} I(u,v)$$

where I(i,j) is the intensity of pixel (i,j), I(u,v) is the intensity of a pixel (u,v) within the k×k neighborhood comprising N pixels, and $I_{edge}$ denotes the output for pixel (i,j). Here, the k×k neighborhood is represented using −a≤u≤a, −b≤v≤b where $$a = \frac{k}{2} + 1$$

and $$b = \frac{k}{2} + 1.$$

Difference layer 606 outputs the determination of the standard deviation to a second average convolutional layer 608 where the local neighborhood is averaged again. Second average convolutional layer 608 may use the same neighborhood size as first average convolutional layer 604, or may use a different neighborhood size. The output from first and second average convolutional layers 604, 608 is input to a thresholding layer 610. Thresholding layer utilizes the inputs and one or more thresholding values to determine edge pixels. If the determined standard deviations in a pixel neighborhood are relatively large compared to the average intensities, it may indicate that the pixel is part of an edge region, and thus can be classified as an edge pixel.

In some examples, thresholding at 610 comprises performing a comparison of the standard deviation to a threshold value. However, the standard deviation in active brightness may also be dependent on the absolute active brightness. As such, the threshold value may be dependent on the magnitude of the active brightness. Thus, in some examples, thresholding at 610 may be based on a comparison between the standard deviation and a model relating standard deviation to magnitude of active brightness. The model may comprise a curve that models the standard deviation as a function of active brightness. Graphically, such a thresholding process may be analogous to graphing a point and categorizing the point based on the location of the point relative to a curve.

Edge detecting layer 600 is configured to output an indication of edge pixels determined via thresholding at 610. The output may comprise the locations of edge pixels. In some examples, the output may comprise an indicator image indicating the location of edge pixels in active brightness image 602. The indicator image may be used as a mask, or may be used to produce a mask. As described herein, the output from edge detecting layer 600 can be utilized by a neural network for denoising. In some examples, output from edge detecting layer 600 is also used for other ToF image processing tasks, such as segmentation, crosstalk correction, edge enhancement, signal conditioning, or other tasks.

Figure 7:
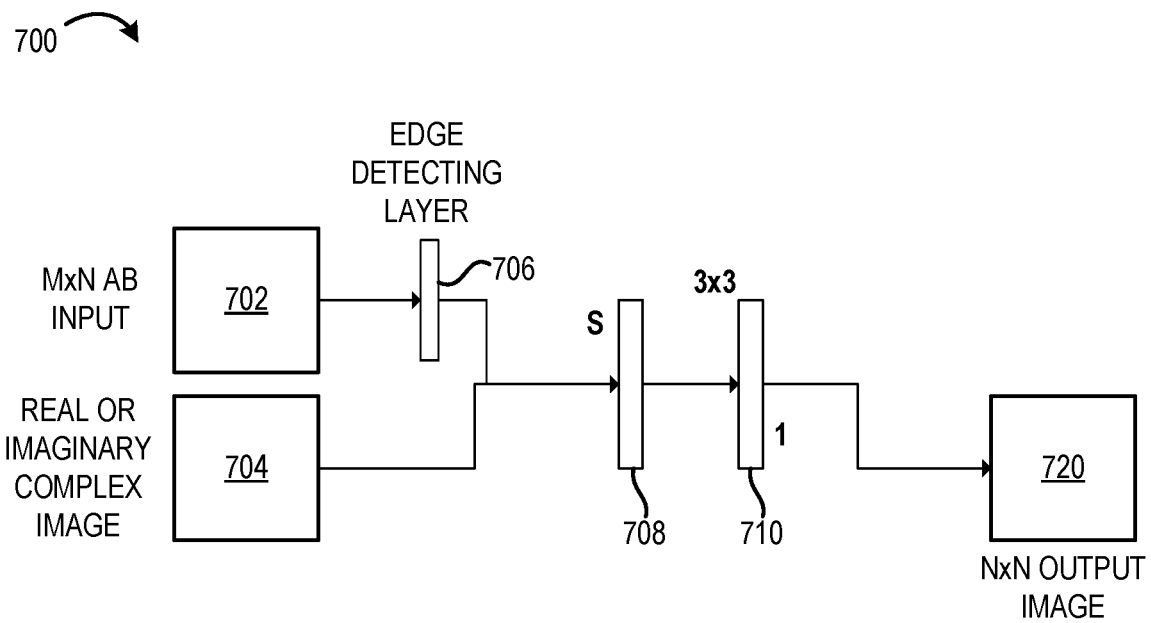
FIG. 7 shows a schematic depiction of an example trained neural network for denoising complex depth data based on edge pixels determined via an edge detecting layer.

FIG. 7 shows an example neural network 700 for denoising a ToF depth image. During denoising, neural network 700 receives input of two M×N images corresponding to the ToF depth image (or three images, where both the real and imaginary parts of the complex image are input). These images comprise an active brightness image 702, and a real part or imaginary part of a complex depth image 704 (i.e., a real complex depth image or imaginary complex depth image). Neural network 700 further comprises an edge detecting layer 706 configured to detect edge pixels in active brightness image 702. As discussed above, edge detection may be based on standard deviation thresholding. Edge detecting layer 600 is an example of edge detecting layer 706.

Active brightness image 702 and complex depth image 704 are input to a first convolutional layer 708, along with the output from edge detecting layer 706 in examples that utilize an edge-detecting layer. The images may be concatenated or otherwise joined for input. As such, first convolutional layer 708 may be configured to receive input of a M×N×2 concatenated image. First convolutional layer 708 is configured to denoise the complex depth image data based on the local noise present in the active brightness image data. In some examples, first convolutional layer 708 may be configured to, based on the output from edge detecting layer 706, not apply a denoising kernel to pixels identified as edge pixels, and apply the denoising kernel to other pixels. First convolutional layer 708 may comprise any suitable number S of kernels (e.g., 12 kernels, 64 kernels). A second convolutional layer 710 combines the results from the S kernels of first convolutional layer 708 and consolidates them into one output image 720. Second convolutional layer 710 comprises a 3×3 kernel, but any suitable kernel size may be used in other examples (e.g., 5×5, 7×7, etc.). The number of kernels at a convolutional layer may be chosen to represent a desired filtering operation to be performed at that layer. The training process to train first and second convolutional layers 708, 710 is discussed below with regards to FIG. 11.

In some examples, the average convolutional kernels in edge detecting layer 706 (e.g., average convolutional layers 604, 608) and second convolutional layer 710 all comprise a k×k kernel size. In other examples the layers may comprise different kernel sizes. In some examples, the size of the denoising kernel used in convolutional layer 710 for denoising each pixel may be tuned to provide a desired level of accuracy per pixel. For example, a relatively larger or smaller kernel size may be used depending on a local signal to noise ratio, and/or based upon the output of the edge detecting layer, as described in more detail below.

Figure 8:
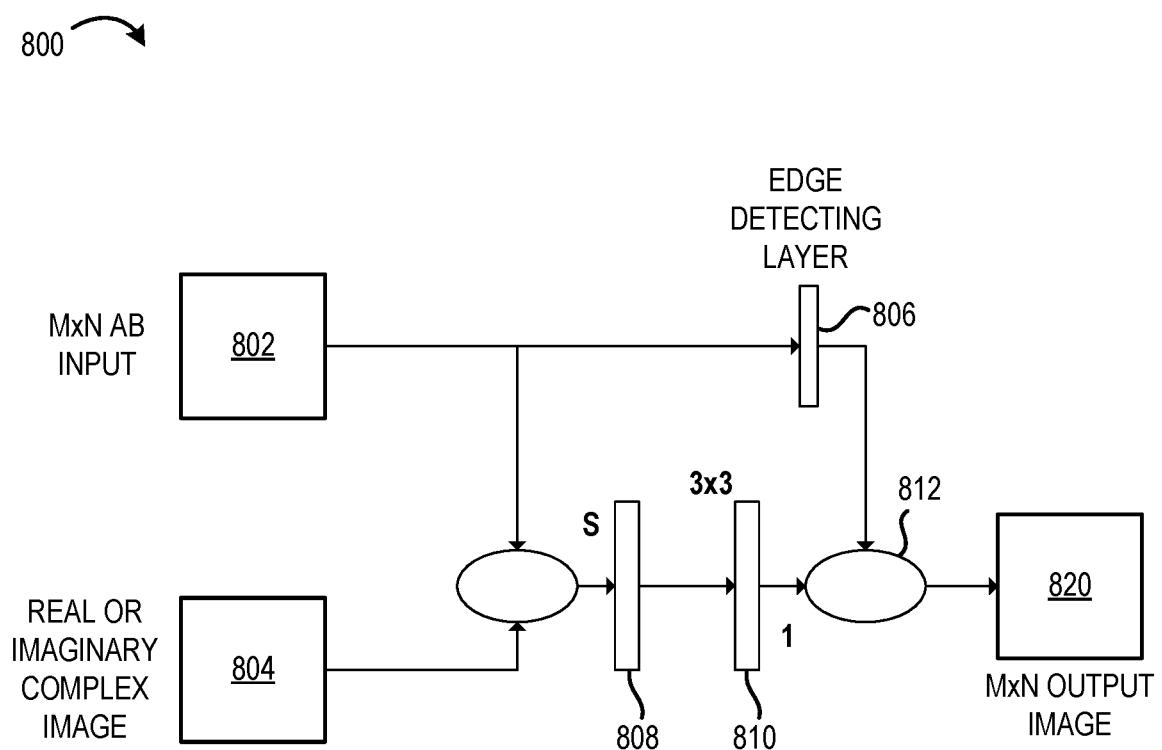
FIG. 8 shows a schematic depiction of an example trained neural network for denoising complex depth data that performs edge detection convolutions in parallel with denoising convolutions.

In some examples a neural network may perform edge detection and denoising convolutions in parallel. As shown in FIG. 8, neural network 800 receives an active brightness image 802 and a real or imaginary complex depth image 804. Neural network 800 comprises an edge detecting layer 806 configured to detect edges in active brightness image 802. Neural network 800 further comprises a first convolutional layer 808 which receives a combination of active brightness image 802 and complex depth image 804. A second convolutional layer 810 combines the results from the S kernels of first convolutional layer 808 and consolidates them into one image comprising denoised output for each pixel. Second convolutional layer 810 utilizes 3×3 kernels, but in other examples any suitable kernel size may be used.

At 812, masking and/or thresholding is performed to filter the denoised output from second convolutional layer 810 based on edge pixels identified at edge detecting layer 806. For example, masking may output denoised pixel data for pixels that are not in edge regions, and not for edge pixels. In such examples, edge pixels can be denoised at a crosstalk correction stage. As a result of the masking at 812, a final denoised image 820 is output.

As discussed above, the kernel sizes used in the convolutional layers (e.g., second convolutional layer 710) may vary on a pixel-by-pixel basis, where larger pixels are utilized to provide more smoothing. In general, relatively smaller kernels may be used to denoise pixels that are relatively close to edge regions to avoid influence by pixels in an adjacent region, while relatively larger kernels may be used for denoising pixels further from edge regions. For example, in a 11×11 neighborhood, the center pixel has 120 neighbors. If there are no edge pixels within the neighborhood, then a 11×11 kernel may be safely applied. Likewise, if there are edge pixels in the neighborhood, then a smaller kernel may be used to exclude the edge pixels. Returning briefly to FIG. 4A, pixel 406 is a distance of four pixels from an edge pixel 408. As such, using a 5×5 kernel to denoise pixel 406 can provide a denoised pixel output with signal contribution from Area 2, and may provide better denoising compared to a 3×3 kernel. However, using a kernel size of 9×9, 11×11, or greater may incorporate signal from pixels of a different region (i.e., Area 1) into the denoised pixel output and may fail to provide adequate denoising. Thus, in some examples, after identifying edge pixels via the edge detecting layer, a distance is determined corresponding to a distance between a pixel in the active brightness image and a nearest edge pixel. Then, a larger denoising kernel can be used when the distance has a relatively larger value, and a smaller denoising kernel used when the distance has a relatively smaller value.

Figure 9:
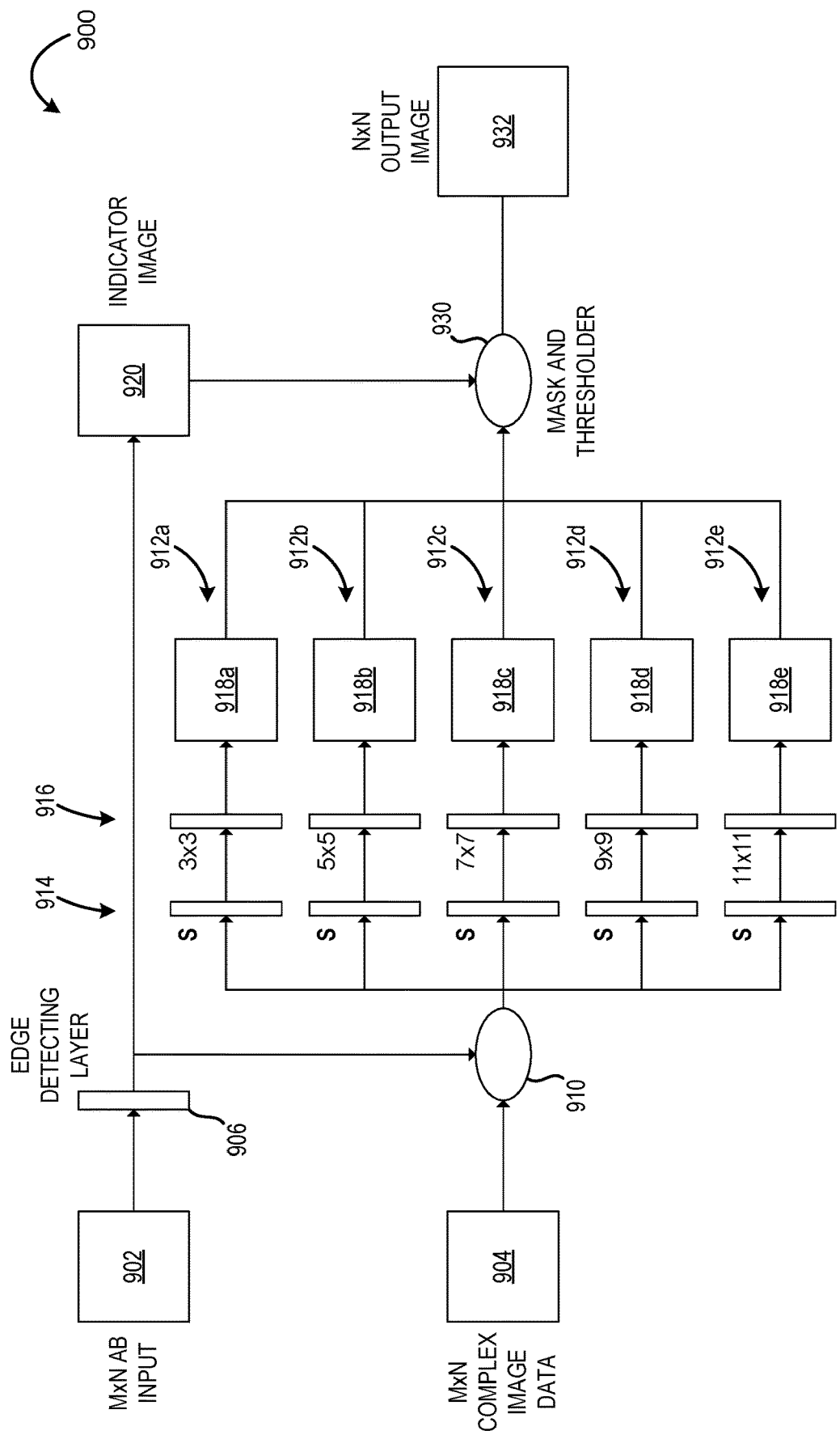
FIG. 9 shows a schematic depiction of an example multi-kernel approach for denoising a complex depth image where kernels of different sizes are applied in parallel.

FIG. 9 shows an example architecture of a neural network 900 comprising a plurality of denoising kernels of different sizes. Neural network 900 receives as input an active brightness image 902 and a real or imaginary complex depth image 904. Active brightness image 902 is input to edge detecting layer 906, which is configured to detect edge pixels, as described above. Output from edge detecting layer 906 is combined (e.g., concatenated) with complex depth image 904 at 910. A combination of active brightness image data and complex depth image data is output to each of five processing pathways 912a-e.

Each pathway comprises a first convolutional layer 914 comprising S kernels which receives as input the active brightness image and complex depth image. Output from each first convolutional layer 914 is input to a second convolutional layer 916. Each second convolutional layer 916 comprises a kernel with a different size. For example, pathway 912a comprises a 3×3 kernel while pathway 912b comprises a 5×5 kernel. Further, each first convolutional layer 914 is configured to output data with dimensions such that it can be input to a corresponding second convolutional layer 916. The output from second convolutional layers 916 provides output images 918a-e, each output image comprising denoised complex depth image data.

Neural network 900 utilizes an indicator image 920 for selecting denoised pixel outputs. Indicator image 920 is determined based on output from edge detecting layer 906. For example, at each pixel in active brightness image 902, a distance can be calculated to a nearest edge pixel based on the edge pixels determined at edge detecting layer 906. As discussed above, a relatively larger kernel can be used based on a relatively greater distance. At 930, a mask (which may be the indicator image or a mask derived from the indicator image) and a thresholder are applied to select, for each pixel, a selected denoised pixel output from output images 918a-e. For example, if indicator image indicates that a 7×7 kernel can be applied to a pixel for more effective smoothing, the mask and thresholder at 930 will select a denoised pixel output from output image 918c. Edge pixels screened out at thresholding layer 910 may be ignored. The selected denoised pixel outputs from 930 then determine output image 932. Neural network 900 outputs output image 932 for further processing in a depth engine pipeline (e.g., phase unwrapping).

Figure 10:
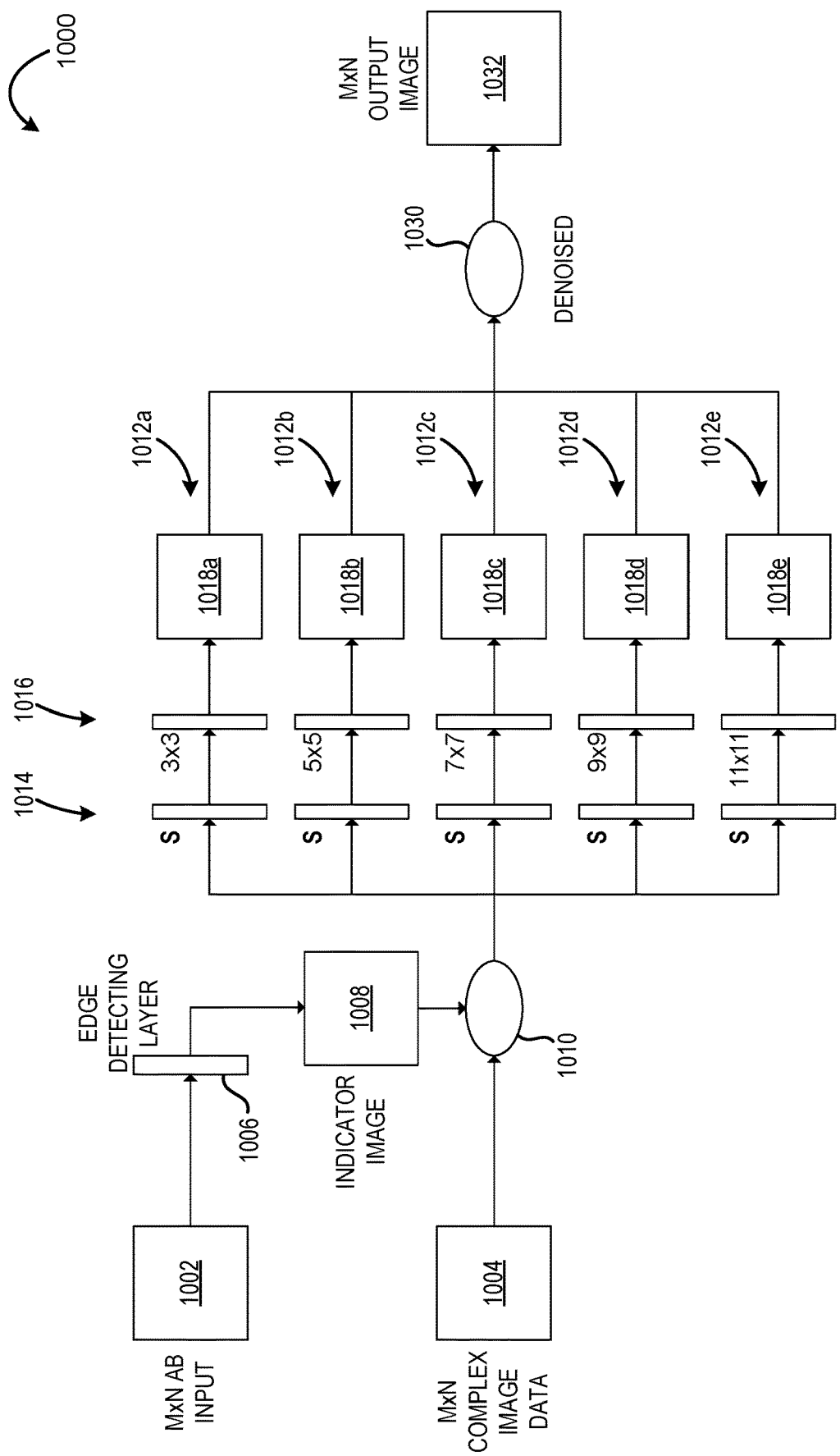
FIG. 10 shows a schematic depiction of another example multi-kernel approach for denoising a complex depth image.

FIG. 10 shows another neural network 1000 comprising a plurality of denoising kernels of different size. Neural network 1000 utilizes selective processing on each pixel based on edge pixels identified at the edge detecting layer. Neural network 1000 receives as input an active brightness image 1002 and a real or imaginary complex depth image 1004. Active brightness image 1002 is input to edge detecting layer 1006, which is configured to detect edge pixels, as described above. Output from edge detecting layer 1006 is used to determine an indicator image 1008 which comprises an indication of a kernel size to apply to a pixel. Active brightness image 1002 is combined with complex depth image 804 and input with indicator image 1008 to a thresholding layer 1010.

Based on indicator image 1008, thresholding layer 1010 outputs a combination of active brightness image data and complex depth image data to each of five processing pathways 1012a-e. For each pixel, thresholding layer 1010 determines which processing pathway 1012a-e should be used for denoising the complex depth image data. As such, each processing pathway 1012a-e may perform selective processing on a portion of the complex depth image data.

Each pathway 1012a-e comprises a first convolutional layer 1014 comprising S kernels which receives as input the active brightness image data and complex depth image data from thresholding layer 1010. Output from each first convolutional layer 1014 is input to a second convolutional layer 1016. As described above, each second convolutional layer 1016 comprises a kernel with a different size and each first convolutional layer 1014 is configured to output data with suitable dimensions for be input to the corresponding second convolutional layer 1016. The output from second convolutional layers 1016 provides output images 1018a-e, each output image comprising denoised complex depth image data.

Neural network 1000 combines output images 1018a-e at 1030 by selecting, for each pixel, a selected denoised pixel output from output images 1018a-e. The selected denoised pixel outputs from 1030 then determine output image 1032. Neural network 1000 outputs output image 1032 for further processing in a depth engine pipeline (e.g., phase unwrapping).

Depending on the computing conditions, such as a GPU or relatively lower image resolution, it can be faster to process images through multiple kernels followed by masking, as in neural network 900, compared to conditional processing for each pixel, as in neural network 1000. However, in some examples when image resolution is relatively high and/or a GPU is not available, neural network 1000 may provide better performance.

In the example multi-kernel approaches depicted in FIGS. 9-10, the complex depth image is processed using five pathways and a respective five different kernel sizes. In other examples, a different number of pathways may be used with different kernel size. For example, the neural network may comprise a first pathway that uses 3×3 kernels and a second pathway that uses 9×9 kernels. A greater number of pathways may provide a wider variety of denoising options to choose between for each pixel. However, fewer pathways may be more computationally efficient.

Figure 11:
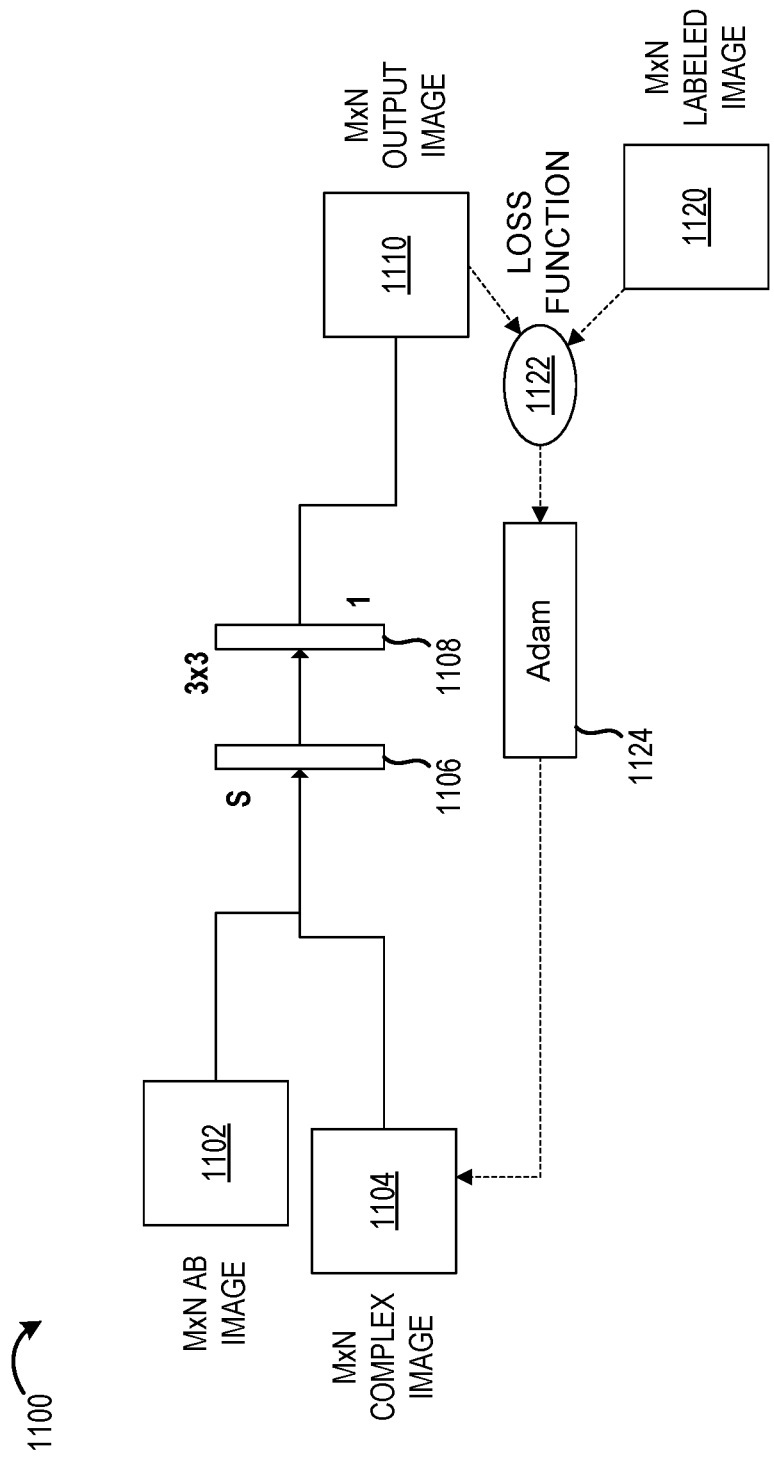
FIG. 11 shows an example training process for training a denoising neural network.

FIG. 11 schematically shows an example architecture for training a neural network 1100 for denoising depth data. Neural network 1100 comprises two layers. A two-layer network may offer better performance compared to deep neural networks that have a greater number of layers, as neural network with fewer layers may be less time consuming and/or computationally more efficient. However, in other examples, a greater number of layers can be used.

During training, neural network 1100 receives an image pair comprising an M×N active brightness image 1102 and a M×N real or imaginary complex depth image 1104, the two input images corresponding to a depth image. The input images may represent experimental data acquired by a ToF image sensor or may comprise simulated image data.

Active brightness image 1102 and complex depth image 1104 are combined (e.g., concatenated) together and input to a first convolutional layer 1106. For example, a concatenation of the two M×N input images results in a M×N×2 image for input into first convolutional layer 1106. The image is convolved using S kernels in first convolutional layer 1106. Each kernel can learn a different weighted function based on the local noise. The results from first convolutional layer 1106 are input to a second convolutional layer 1108 that combines the results (e.g., a weighted sum) from the S kernels of the first layer into an M×N output image 1110. Output image 1110 represents the denoised image.

During training, output image 1110 is compared with a real or imaginary ground truth labeled complex depth image 1120 using a loss function 1122. Any suitable loss function may be used. In some examples, an L2 (least square) loss function is employed that calculates the loss as $$L_2\text{Loss} = \frac{1}{b}\sum_{k=1}^{b}\frac{\sum_{i_k=1}^{r}\sum_{j_k=1}^{c}(y(i_k, j_k)' - y(i_k, j_k))^2}{N}$$

where r is the number of rows, c is the number of columns, and N is the number of pixels in the image. The output of the network (i.e., the predicted label from output image 1110) is $y(i_k j_k)'$ while y denotes the label (i.e., ground truth label from the ground truth complex depth image 1120). Further, k represents the batch number out of a batch size of b, where each batch comprises one or more input image pairs and a respective one or more ground truth labeled complex depth image. In some examples, the batch size b varies between 8 and 16 while in other examples any suitable batch size may be used.

Continuing, at 1124, training is done using Adam, an adaptive first order gradient optimization function. Adam iteratively updates the weightings in the two convolutional layers based on errors backpropagated from loss function 1122. Weightings may be updated after every batch and the training process may comprise any suitable number of batches, such as 10, 100, 1000, or more, for example. Adam may offer good performance for large and/or noisy datasets while being computationally and memory efficient. In other examples, any other suitable training algorithm can be alternatively or additionally employed, such as Momentum, Adagrad, RMSProp, a traditional stochastic gradient descent method, or other algorithm.

In some examples, training can be performed using different blocks to handle positive and negative values. In some other examples, training can be modified for handling positive and negative values in the real and imaginary complex depth images by learning without an activation function. As such, the modified training may help avoid problems when values change sign within a single image, which is possible for complex data of ToF images.

Neural network 1100 does not comprise an edge detecting layer. As such, values near edges may bleed across edges (blurring) in some examples. However, the trained neural network can be incorporated into a neural network comprising an edge detecting layer.

In the example depicted in FIG. 11, second convolutional layer 1108 comprises a 3×3 kernel. However, any suitable kernel size may be used. For example, neural network 1100 may also be used to train first and second convolutional layers with 5×5 kernels (or 7×7, 9×9, etc.) in the second convolutional layer. As such, a plurality of trained convolutional layers having different kernel sizes can be used in a parallel neural network, such as neural network 900 or neural network 1000.

Figure 12:
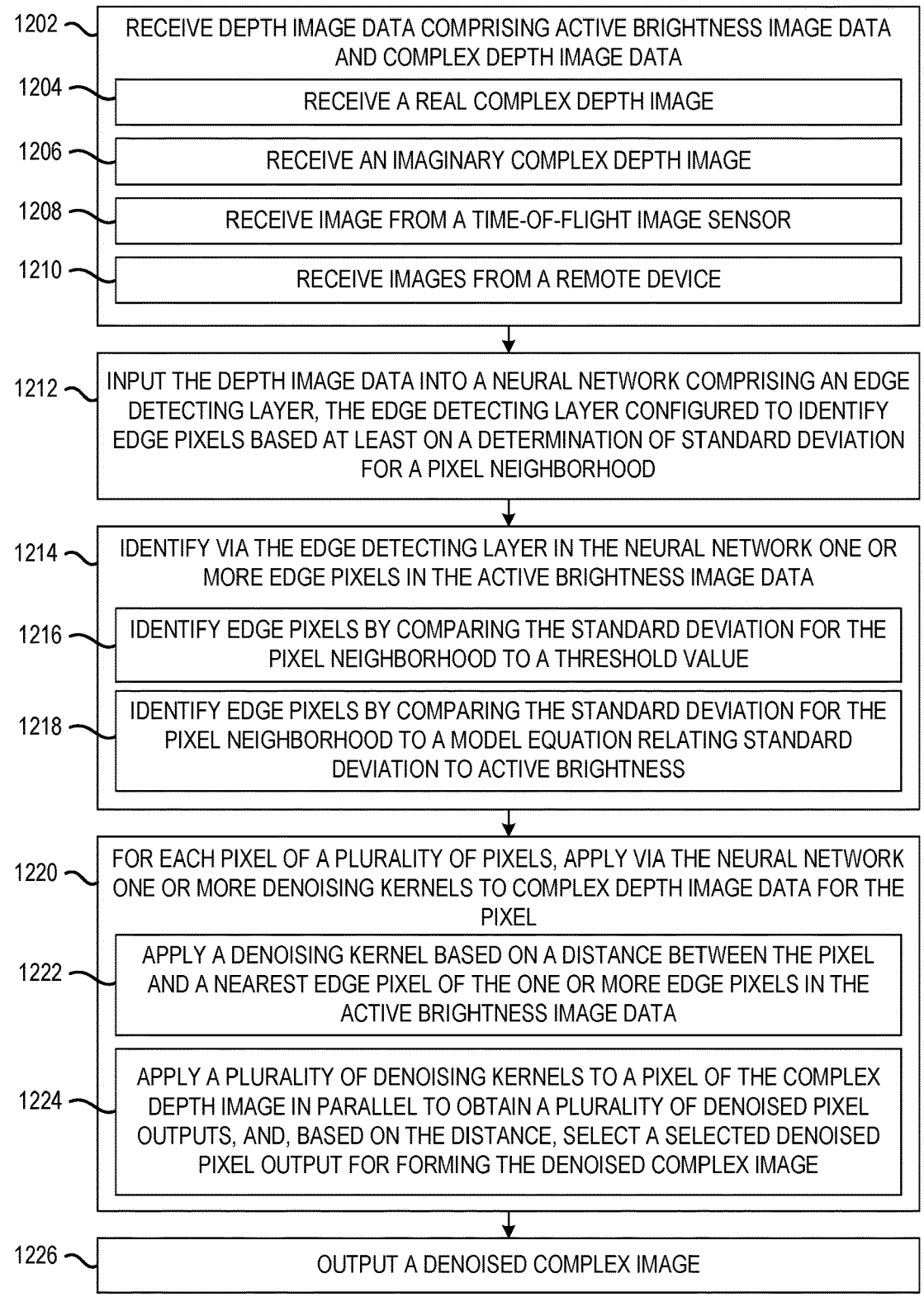
FIG. 12 shows a flow diagram of an example method for denoising depth image data using a neural network.

FIG. 12 shows a flow diagram depicting an example method 1200 for denoising a depth image. At 1202, the method comprises receiving depth image data comprising active brightness image data and complex depth image data. In some examples, at 1204, the method comprises receiving a real portion of a complex depth image (a "real complex depth image"). Further, in some examples, at 1206, the method comprises receiving an imaginary portion of a complex depth image (an "imaginary complex depth image"). In some examples, as indicated at 1208, the images may be received from a local ToF image sensor, such as when the pipeline is embedded in a device comprising a ToF sensor. In other examples, at 1210, the method comprises receiving the images from a remote device, such as where a distributed pipeline is used.

Continuing, at 1212, method 1200 further comprises inputting the depth image data into a neural network comprising an edge detecting layer, the edge detecting layer configured to identify edge pixels based at least on a determination of standard deviation for a pixel neighborhood. Method 1200 further comprises, at 1214, identifying via the edge detecting layer in the neural network one or more edge pixels in the active brightness image data. In some examples, at 1216, edge pixels are identified by comparing the standard deviation for the pixel neighborhood to a threshold value.

As described above, in some examples the threshold value to which the determined standard deviation is compared can vary based upon the average active brightness for the neighborhood. Thus, in some examples, at 1218, the method comprises identifying edge pixels by comparing the standard deviation for the pixel neighborhood to a model equation relating standard deviation to active brightness.

At 1220, method 1200 further comprises, for each pixel of a plurality of pixels, applying via the neural network one or more denoising kernels to complex depth image data for the pixel. In some examples, at 1222, the method comprises applying a denoising kernel based on a distance between the pixel and a nearest edge pixel of the one or more edge pixels in the active brightness image data. For example, the method may comprise applying a first, larger denoising kernel to the pixel when the distance has a first, greater distance value, and applying a second, smaller denoising kernel to the pixel when the distance has a second, lesser distance value. Further, in some examples, at 1224, the method comprises applying a plurality of denoising kernels to a pixel of the complex depth image in parallel to obtain a plurality of denoised pixel outputs, and, based on the distance, selecting a selected denoised pixel output for forming the denoised complex depth image. For example, the method may utilize a neural network comprising a plurality of convolutional layers in a parallel architecture, such as example neural networks 900 or 1000.

At 1226, method 1200 further comprises outputting a denoised complex depth image. The denoised complex depth image may be output to later processes in a depth engine pipeline, e.g., for phase unwrapping. In some examples, the method comprises denoising the real complex depth image and outputting a denoised real complex depth image. Further, in some examples, the method comprises denoising the imaginary complex depth image and outputting a denoised imaginary complex depth image. Additionally, where both the real and imaginary complex depth images are input into the neural network, both the real and imaginary complex depth images may be denoised.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
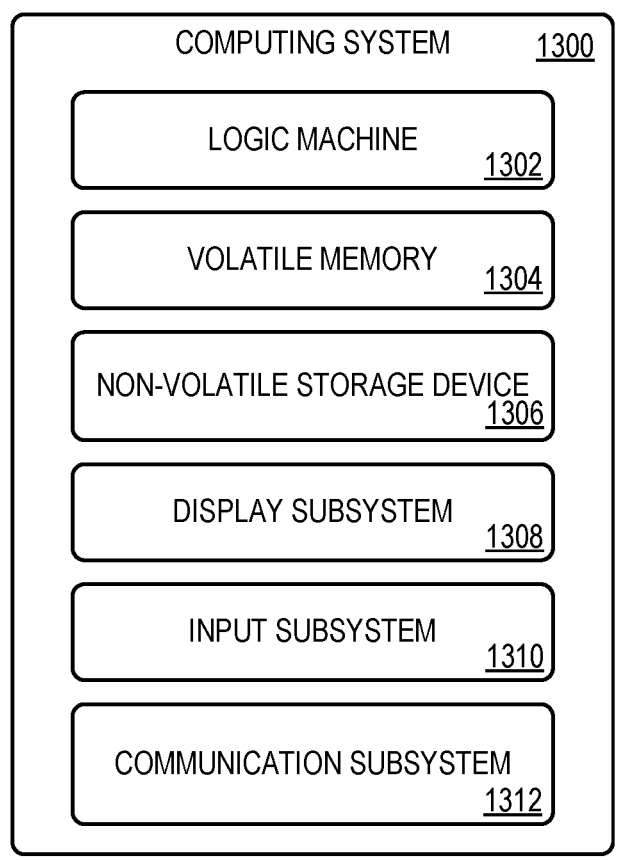
FIG. 13 shows a block diagram of an example computing system.

FIG. 13 schematically shows a block diagram depicting an example computing system 1300 that can enact one or more of the methods and processes described above. Computing system 1300 is shown in simplified form. Computing system 1300 may embody the computer device 10 described above and illustrated in FIG. 2. Computing system 1300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices. Devices 100A-E and depth imaging system 200 are examples of computing system 1300.

Computing system 1300 includes a logic processor 1302 volatile memory 1304, and a non-volatile storage device

1306. Computing system 1300 may optionally include a display subsystem 1308, input subsystem 1310, communication subsystem 1312, and/or other components not shown in FIG. 13.

Logic processor 1302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1306 includes one or more physical devices configured to hold instructions executable by the logic processors to implement the methods and processes described herein. When such methods and processes are implemented, the state of non-volatile storage device 1306 may be transformed—e.g., to hold different data.

Non-volatile storage device 1306 may include physical devices that are removable and/or built-in. Non-volatile storage device 1306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1306 may include nonvolatile, dynamic, static, read/write, read-only, sequential-access, location-addressable, file-addressable, and/or content-addressable devices. It will be appreciated that non-volatile storage device 1306 is configured to hold instructions even when power is cut to the non-volatile storage device 1306.

Volatile memory 1304 may include physical devices that include random access memory. Volatile memory 1304 is typically utilized by logic processor 1302 to temporarily store information during processing of software instructions. It will be appreciated that volatile memory 1304 typically does not continue to store instructions when power is cut to the volatile memory 1304.

Aspects of logic processor 1302, volatile memory 1304, and non-volatile storage device 1306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "engine" may be used to describe an aspect of computing system 1300 typically implemented in software by a processor to perform a particular function using portions of volatile memory, which function involves transformative processing that specially configures the processor to perform the function. Thus, a program or engine may be instantiated via logic processor 1302 executing instructions held by non-volatile storage device 1306, using portions of volatile memory 1304. It will be understood that different programs and/or engines may be instantiated from the same application, service, code block, object, library, routine, API, function, etc. Likewise, the same program and/or engine may be instantiated by different applications, services, code blocks, objects, routines, APIs, functions, etc. The terms "program" and "engine" may encompass individual or groups of executable files, data files, libraries, drivers, scripts, database records, etc.

When included, display subsystem 1308 may be used to present a visual representation of data held by non-volatile storage device 1306. The visual representation may take the form of a graphical user interface (GUI). As the herein described methods and processes change the data held by the non-volatile storage device, and thus transform the state of the non-volatile storage device, the state of display subsystem 1308 may likewise be transformed to visually represent changes in the underlying data. Display subsystem 1308 may include one or more display devices utilizing virtually any type of technology. Such display devices may be combined with logic processor 1302, volatile memory 1304, and/or non-volatile storage device 1306 in a shared enclosure, or such display devices may be peripheral display devices.

When included, input subsystem 1310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1312 may be configured to communicatively couple various computing devices described herein with each other, and with other devices. Communication subsystem 1312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1300 to send and/or receive messages to and/or from other devices via a network such as the Internet.

Another example provides a computing device comprising a logic machine, and a storage machine holding instructions executable by the logic machine to implement a depth image processing pipeline comprising a neural network, the neural network comprising an edge detecting layer and being configured to receive input of an active brightness image, receive input of one or more of real data or imaginary data of a complex depth image, the complex depth image corresponding to the active brightness image, at the edge detecting layer, apply one or more convolutional processes to the active brightness image to identify one or more edge pixels in the active brightness image, and at a second layer, denoise one or more of the real data or the imaginary data of the complex depth image based on the one or more edge pixels identified. In some such examples, the instructions are executable not to apply a denoising kernel to pixels identified as edge pixels, and apply the denoising kernel to other pixels. In some such examples, the instructions alternatively or additionally are executable to determine a distance from a pixel in the active brightness image to an edge pixel of the one or more edge pixels and, based on the distance, apply a denoising kernel to a pixel of the complex depth image corresponding to the pixel in the active brightness image. In some such examples, the neural network alternatively or additionally comprises a plurality of denoising kernels of different sizes, and the instructions are executable to process the pixel of the complex depth image via the plurality of denoising kernels in parallel to obtain a respective plurality of denoised pixel outputs, and select a selected denoised pixel output based on the distance. In some such examples, the instructions alternatively or additionally are executable to apply a first, larger denoising kernel to the pixel when the distance has a first, greater value and apply a second, smaller denoising kernel when the distance has a second lesser value. In some such examples, the neural network alternatively or additionally comprises a first average convolution layer, a difference layer, a second average convolution layer, and a thresholding layer. In some such examples, the edge detecting layer alternatively or additionally is configured to determine a standard deviation for a pixel neighborhood. In some such examples, the instructions alternatively or additionally are executable to identify the one or more edge pixels based at least on a comparison between the standard deviation determined for the pixel neighborhood and a model relating standard deviation to active brightness. In some such examples, the active brightness image and the complex depth image alternatively or additionally are received from a remote computing device comprising a depth image sensor. In some such examples, the computing device alternatively or additionally further comprises a depth camera incorporating a depth image sensor, wherein the active brightness image and complex depth image are received from the depth image sensor.

Another example provides a computing device comprising a logic machine, and a storage machine holding instructions executable by the logic machine to implement a depth image processing pipeline, the depth image processing pipeline configured to denoise depth image data by receiving an input of an active brightness image and a complex depth image each corresponding to the depth image, the complex depth image comprising real complex data and imaginary complex data, inputting the active brightness image and one or more of the real complex data or the imaginary complex data into a neural network, the neural network configured to provide a combination of the active brightness image and the one or more of real complex data or imaginary complex data to a first convolutional layer, the neural network further configured to denoise the one or more of the real complex data or the imaginary complex data based on the active brightness image, and outputting one or more of a denoised real complex data image or a denoised imaginary complex data image. In some such examples, the instructions are further executable to train the neural network using an Adam adaptive first order gradient optimization function. In some such examples, the neural network alternatively or additionally comprises an edge detecting layer configured to identify one or more edge pixels in the active brightness image, and wherein the neural network is configured to denoise the one or more of the real complex data or the imaginary complex data by not applying a denoising kernel to the one or more edge pixels and applying the denoising kernel to other pixels. In some such examples, the instructions alternatively or additionally are executable to determine a distance from a pixel in the active brightness image to an edge pixel of the one or more edge pixels and apply the denoising kernel to a complex depth image pixel corresponding to the active brightness pixel based on the distance. In some such examples, the instructions alternatively or additionally are executable to apply a first, larger denoising kernel to the complex depth image pixel when the distance has a first, greater distance value and apply a second, smaller size kernel when the distance has a second, lesser distance value. In some such examples, the neural network alternatively or additionally comprises a plurality of denoising kernels of different sizes, and the instructions are executable to process the complex depth image pixel via the plurality of denoising kernels in parallel to obtain a respective plurality of denoised pixel outputs, and select a selected denoised pixel output based on the distance.

Another example provides a method enacted on a computing device, a method comprising receiving depth image data comprising active brightness image data and complex depth image data, inputting the depth image data into a neural network comprising an edge detecting layer, the edge detecting layer configured to identify edge pixels based at least on a determination of a standard deviation for a pixel neighborhood, identifying via the edge detecting layer in the neural network one or more edge pixels in the active brightness image data, for each pixel of a plurality of pixels, applying via the neural network one or more denoising kernels to complex depth image data for the pixel based on a distance between the pixel and a nearest edge pixel of the one or more edge pixels in the active brightness image data, and outputting a denoised complex depth image. In some such examples, the method comprises applying a first, larger denoising kernel to the pixel when the distance has a first, greater distance value, and applying a second, smaller denoising kernel to the pixel when the distance has a second, lesser distance value. In some such examples, applying a denoising kernel alternatively or additionally comprises applying a plurality of denoising kernels to a pixel of the complex depth image in parallel to obtain a plurality of denoised pixel outputs, and, based on the distance, selecting a selected denoised pixel output for forming the denoised complex depth image. In some such examples, identifying the one or more edge pixels alternatively or additionally comprises comparing the standard deviation for a pixel neighborhood to a threshold value.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
a processor; and
a non-volatile storage device holding instructions executable by the processor to implement a depth image processing pipeline comprising a neural network, the neural network comprising an edge detecting layer, and the instructions executable to
receive input of active brightness image data for a plurality of time-of-flight (ToF) camera light source modulation frequencies, the active brightness image data comprising a plurality of pixel values each computed from a real part and an imaginary part of a signal sensed at a plurality of taps at a pixel of a depth image sensor,
receive input of complex depth image data for the plurality of ToF camera light source modulation frequencies, the complex depth image data comprising a plurality of phase samples for each ToF camera light source modulation frequency of the plurality of ToF camera light source modulation frequencies, and the complex depth image data comprising real depth image data and imaginary depth image data for each pixel of data,
at the edge detecting layer of the neural network, apply one or more convolutional processes to the active brightness image data to identify one or more edge pixels in the active brightness image data,
at a second layer of the neural network, denoise one or more of the real data or the imaginary data of the complex depth image data by not applying a denoising filter to the one or more edge pixels identified and applying the denoising filter to other pixels, thereby forming denoised complex depth image data,
perform phase unwrapping on the denoised complex depth image data, thereby forming a depth image,
denoise pixels identified as edge pixels at a cross-talk correction stage, and
output the depth image.

2. The computing device of claim 1, wherein the instructions are executable to determine a distance from a pixel in the active brightness image data to an edge pixel of the one or more edge pixels and, based on the distance, apply a denoising kernel to a pixel of the complex depth image data corresponding to the pixel in the active brightness image data.

3. The computing device of claim 2, wherein the neural network comprises a plurality of denoising kernels of different sizes, and the instructions are executable to process the pixel of the complex depth image data via the plurality of denoising kernels in parallel to obtain a respective plurality of denoised pixel outputs, and select a selected denoised pixel output based on the distance.

4. The computing device of claim 2, wherein the instructions are executable to apply a first, larger denoising kernel to the pixel when the distance has a first, greater value and apply a second, smaller denoising kernel when the distance has a second lesser value.

5. The computing device of claim 1, wherein the neural network comprises a first average convolution layer, a difference layer, a second average convolution layer, and a thresholding layer.

6. The computing device of claim 1, wherein the edge detecting layer is configured to determine a standard deviation for a pixel neighborhood.

7. The computing device of claim 6, wherein the instructions are executable to identify the one or more edge pixels based at least on a comparison between the standard deviation determined for the pixel neighborhood and a model relating standard deviation to active brightness.

8. The computing device of claim 1, wherein the active brightness image data and the complex depth image data are received from a remote computing device comprising the depth image sensor.

9. The computing device of claim 1, further comprising a depth camera incorporating the depth image sensor, wherein the active brightness image data and complex depth image data are received from the depth image sensor.

10. A computing device comprising:
a processor; and
a non-volatile storage device holding instructions executable by the processor to implement a depth image processing pipeline, the depth image processing pipeline configured to denoise depth image data by
receiving an input of active brightness image data for a plurality of time-of-flight (ToF) camera light source modulation frequencies and complex depth image data for the plurality of ToF camera light source modulation frequencies, the active brightness image comprising a plurality of pixel values each computed from a real part and an imaginary part of a signal sensed at a plurality of taps at a pixel of a depth image sensor, the complex depth image data comprising a plurality of phase samples for each ToF camera light source modulation frequency of the plurality of ToF camera light source modulation frequencies, and the complex depth image data comprising real complex data and imaginary complex data,
inputting the active brightness image data and one or more of the real complex data or the imaginary complex data into a neural network comprising an edge detecting layer, the neural network configured to provide a combination of the active brightness image data and the one or more of real complex data or imaginary complex data to the edge detecting layer to identify one or more edge pixels in the active brightness image data, the neural network further configured to denoise the one or more of the real complex data or the imaginary complex data by not applying a denoising kernel to the one or more edge pixels and applying the denoising kernel to other pixels,
outputting one or more of denoised real complex data or denoised imaginary complex data,
performing phase unwrapping on the one or more of denoised real complex data or denoised imaginary complex data, thereby forming a depth image,
denoising the one or more edge pixels at a later cross-talk correction stage, and
outputting the depth image.

11. The computing device of claim 10, wherein the instructions are further executable to train the neural network using an adaptive first order gradient optimization function.

12. The computing device of claim 10, wherein the instructions are executable to determine a distance from a pixel in the active brightness image data to an edge pixel of the one or more edge pixels and apply the denoising kernel to a complex depth image pixel corresponding to the active brightness pixel based on the distance.

13. The computing device of claim 12, wherein the instructions are executable to apply a first, larger denoising kernel to the complex depth image pixel when the distance has a first, greater distance value and apply a second, smaller size kernel when the distance has a second, lesser distance value.

14. The computing device of claim 12, wherein the neural network comprises a plurality of denoising kernels of different sizes, and the instructions are executable to process the complex depth image pixel via the plurality of denoising kernels in parallel to obtain a respective plurality of denoised pixel outputs, and select a selected denoised pixel output based on the distance.

15. A method, comprising:
receiving depth image data for a plurality of time-of-flight (ToF) camera light source modulation frequencies, the depth image data comprising active brightness image data and complex depth image data, the active brightness image data comprising a plurality of pixel values each computed from a real part and an imaginary part of a signal sensed at a pixel of a depth image sensor, the complex depth image data comprising a plurality of phase samples for each ToF camera light source modulation frequency of the plurality of ToF camera light source modulation frequencies, and the complex depth image data comprising real depth image data and imaginary depth image data;
inputting the complex depth image data into a neural network comprising an edge detecting layer, the edge detecting layer configured to identify edge pixels based at least on a determination of a standard deviation for a pixel neighborhood;
identifying via the edge detecting layer in the neural network one or more edge pixels in the active brightness image data;
for each pixel of a plurality of pixels that are not edge pixels, applying via the neural network one or more denoising kernels to the complex depth image data for the pixel based on a distance between the pixel and a nearest edge pixel of the one or more edge pixels in the active brightness image data, thereby forming denoised complex depth image data;
perform phase unwrapping on the denoised complex depth image data, thereby forming a depth image;
denoising the one or more edge pixels at a later cross-talk correction stage; and
output a depth image.

16. The method of claim 15, wherein the method comprises applying a first, larger denoising kernel to the pixel when the distance has a first, greater distance value, and applying a second, smaller denoising kernel to the pixel when the distance has a second, lesser distance value.

17. The method of claim 15, wherein applying a denoising kernel comprises applying a plurality of denoising kernels to a pixel of the complex depth image data in parallel to obtain a plurality of denoised pixel outputs, and, based on the distance, selecting a selected denoised pixel output for forming the denoised complex depth image data.

18. The method of claim 15, wherein identifying the one or more edge pixels comprises comparing the standard deviation for a pixel neighborhood to a threshold value.

* * * * *